B. DUNCAN & J. E. LEYDEN.
Type-Form for Electrotyping.
No. 223,584.  Patented Jan. 13, 1880.
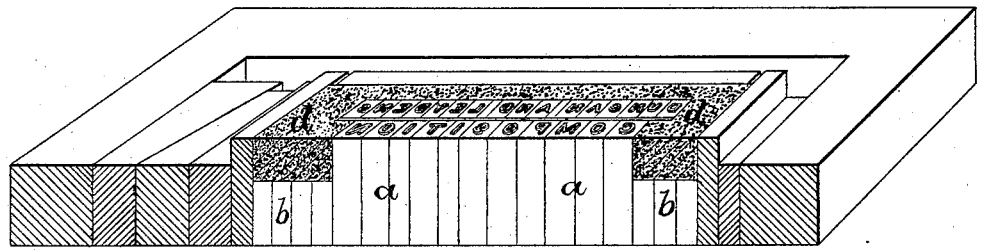
Witnesses
John M. Dumer.
Harry Smith
Inventors
Benjamin Duncan
and
John E. Leyden
by their Attorneys
Howson & Son

United States Patent Office.

BENJAMIN DUNCAN AND JOHN E. LEYDEN, OF PHILADELPHIA, PA.

TYPE-FORM FOR ELECTROTYPING.

SPECIFICATION forming part of Letters Patent No. 223,584, dated January 13, 1880.

Application filed October 25, 1879.

*To all whom it may concern:*

Be it known that we, BENJAMIN DUNCAN and JOHN E. LEYDEN, both of Philadelphia, Pennsylvania, have invented a new and useful Improvement in Type-Forms for Electrotyping, of which the following is a specification.

Our invention consists, mainly, of a type-form the depressions of which are filled with a composition which is sufficiently hard to resist the wax of the electrotype-matrix, but is soluble in or admits of disintegration by water, the object of our invention being to avoid the difficulties, explained hereinafter, in filling the depressions of the form with the usual plaster-of-paris mixture, and in removing the said mixture from the form after the making of the matrix therefrom.

In setting up type for certain classes of printed matter, particularly job-work, it is the custom to use short spaces and quads—that is to say, spaces and quads considerably less in height than the type. Before preparing an electrotype-matrix from a form of type set up in this manner, it is customary to fill the interstices between the words and lines of type and between the lines and the rules with a mixture of plaster-of-paris and water, the mixture reaching to the shoulders of the type, so that when the plaster becomes hard the form presents a comparatively level and uniform surface, from which the wax matrix will readily clear itself.

In the accompanying drawing, which represents a sectional perspective view of a type-form filled in this manner, *a a* are the type, *b* the spaces, and *d* the filling.

The plaster-of-paris filling is objectionable for the following reasons: First, care must be taken that the composition is not applied to the faces of the type, as it is very difficult to remove it therefrom when it becomes hard; and, secondly, after the matrix has been made the composition must be picked from the depressions between the type with a suitable implement, a time-consuming operation and one requiring the exercise of considerable care.

These objections we overcome by using a filling composition of such a character as to be soluble in or capable of disintegration by water, so that when the matrix has been prepared from the form the composition may be washed from the depressions by means of a stream of water or by a brush and water or other like means.

Another advantage of using a soluble filling composition is that the same care need not be exercised in applying the filling as is necessary with the ordinary mixture, for the surplus composition can be readily washed away from the faces of the type, and the filling thereby reduced to the proper level.

While different kinds of soluble filling composition may be used, the best results have been attained by a composition of equal parts of clay, plaster-of-paris, and plumbago, dissolved in water until it forms a plastic mass, which can be readily handled and packed into the interstices of the form. This composition forms a firm and hard filling when dry; but, owing to the presence of clay, the composition can be readily dissolved or disintegrated by the application of water thereto. The addition of plumbago is for the purpose of preventing the adhesion of particles of raw clay to the surface of the wax matrix when the latter is withdrawn from the form.

In some cases, instead of using raw plaster-of-paris, the plaster may be mixed with water, allowed to become hard, and then ground or pulverized prior to use.

Flour or other soluble granular material may be used in place of clay, or other compounds resembling plaster, but soluble in or capable of disintegration by water, may be employed.

We claim as our invention—

1. A type-form in which the depressions are packed with a composition soluble in or admitting of being disintegrated by water, as and for the purpose set forth.

2. A filling composition consisting of clay or other soluble granular material and plaster-of-paris, as specified.

In testimony whereof we have signed our names to this specification in the presence of two subscribing witnesses.

BENJ. DUNCAN.
JOHN E. LEYDEN.

Witnesses:
ALEXANDER PATTERSON,
HARRY SMITH.